United States Patent [19]
Gunnels, Jr.

[11] 3,986,811
[45] Oct. 19, 1976

[54] MOLDING APPARATUS WITH RECEIVING CHUTE DEVICE

[75] Inventor: William F. Gunnels, Jr., Hendersonville, N.C.

[73] Assignee: General Electric Company, New York, N.Y.

[22] Filed: July 3, 1975

[21] Appl. No.: 592,912

[52] U.S. Cl. .................... 425/455 R; 193/25 R; 425/436 RM
[51] Int. Cl.² .................................... B29F 1/14
[58] Field of Search ......... 425/436 R, 436 RM, 441, 425/455 R; 193/25 R, 25 A

[56] References Cited
UNITED STATES PATENTS

| 1,473,081 | 11/1923 | Cook | 193/25 A |
| 2,809,394 | 10/1957 | Harvey | 425/455 R |
| 2,839,786 | 6/1958 | Alesi | 425/455 R |
| 3,712,781 | 1/1973 | Schmier | 425/455 R |
| 3,732,961 | 5/1973 | Thornton et al. | 193/25 R |
| 3,907,483 | 9/1975 | York | 425/455 R |
| 3,910,741 | 10/1975 | Mehnert | 425/455 R |

Primary Examiner—Francis S. Husar
Assistant Examiner—Carl Rowold
Attorney, Agent, or Firm—Sidney Greenberg

[57] ABSTRACT

Foldable chute is arranged below the mold members of a molding machine to receive the molded product dropped from the machine when the mold members separate. Means are provided for deflecting the dropped molded product to control the position in which it drops on the chute.

9 Claims, 6 Drawing Figures

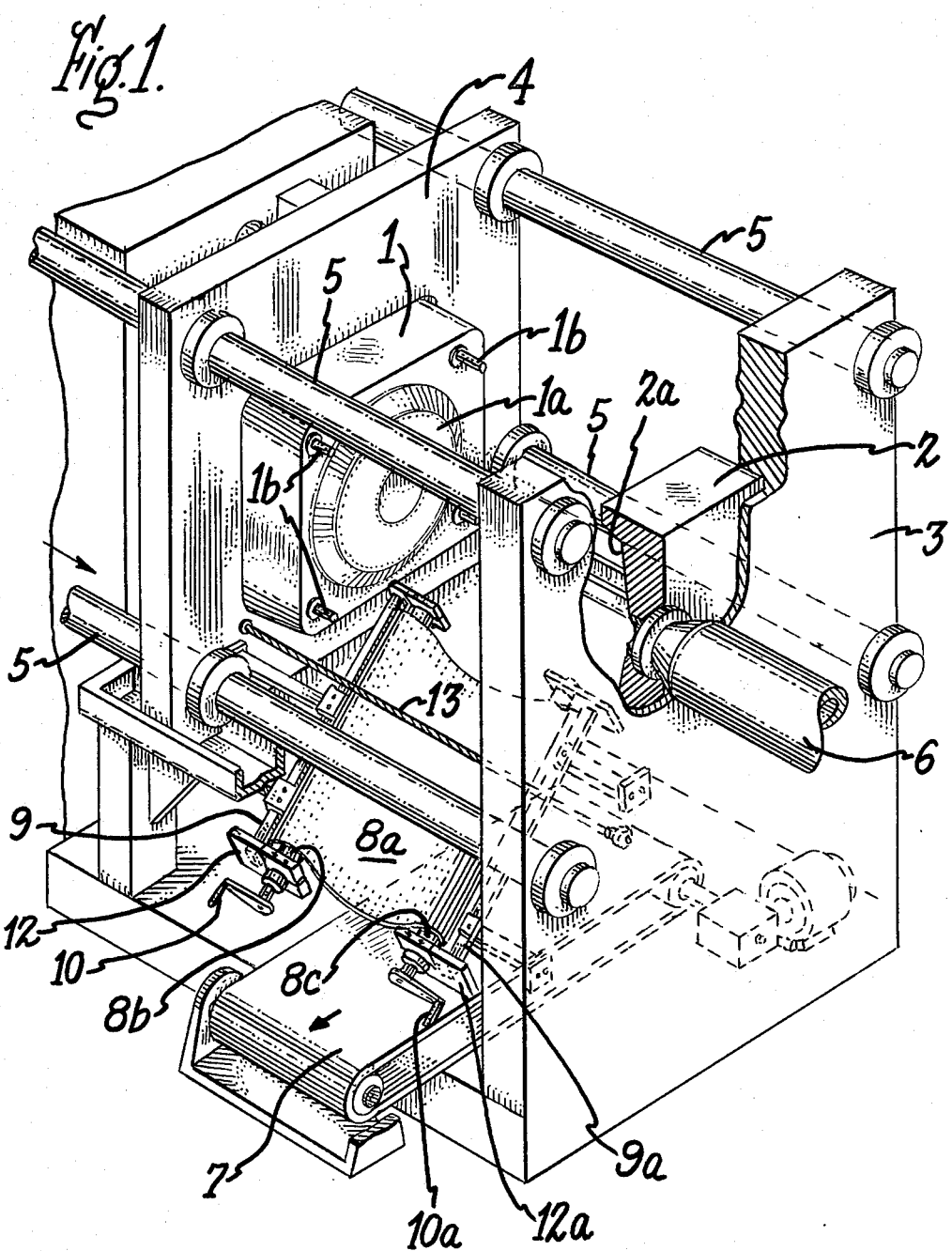

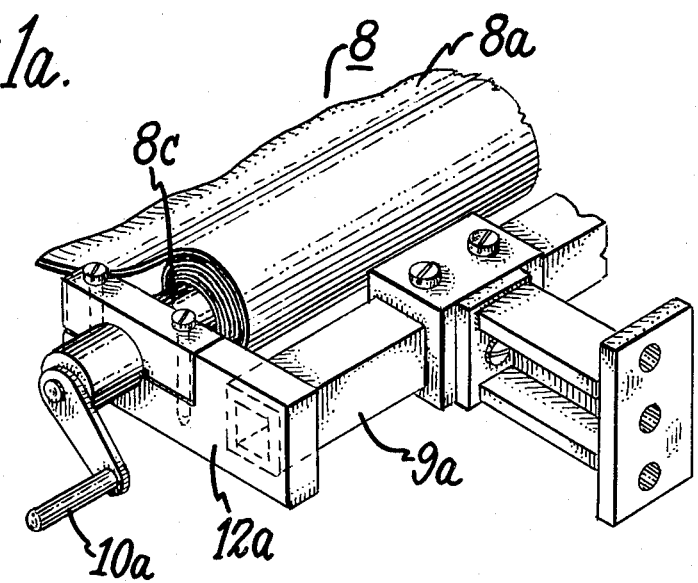
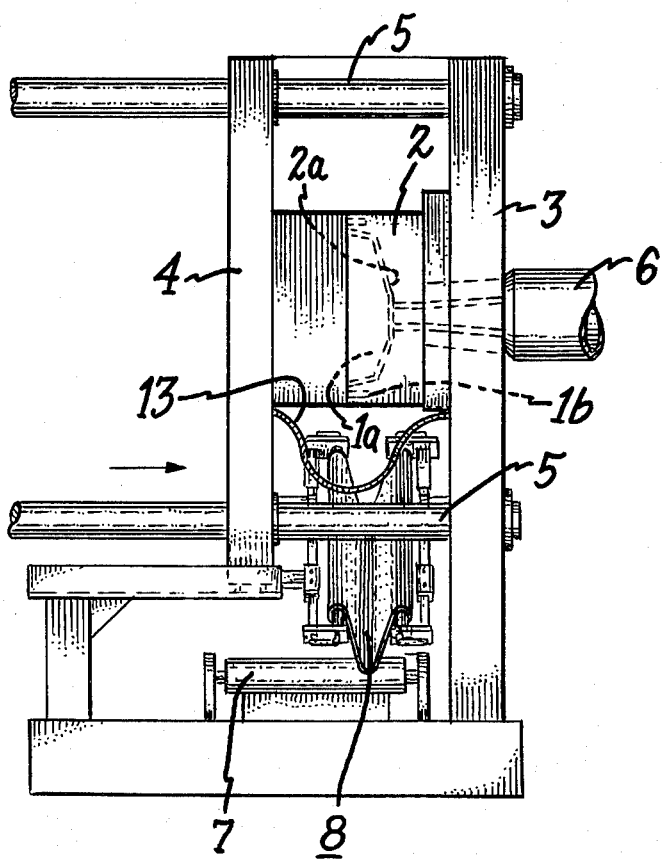

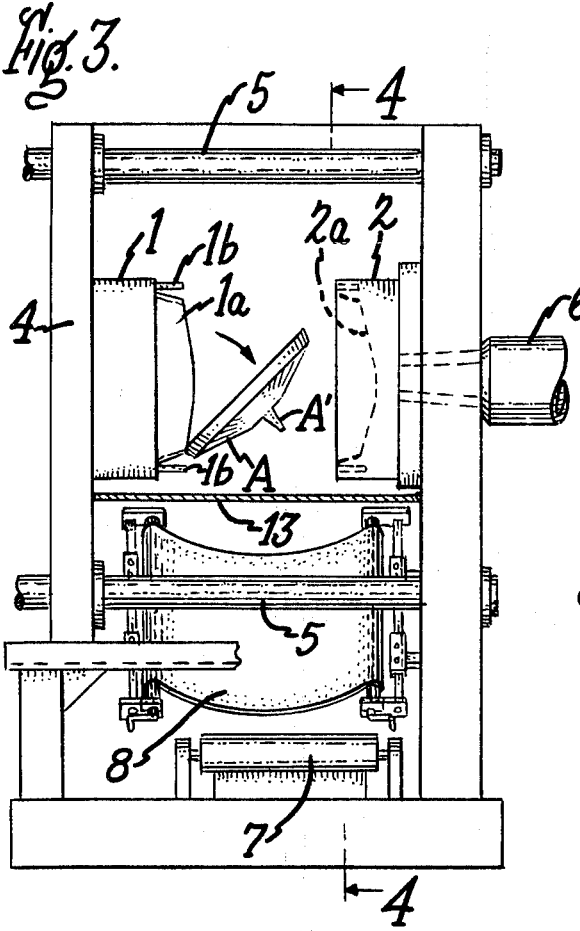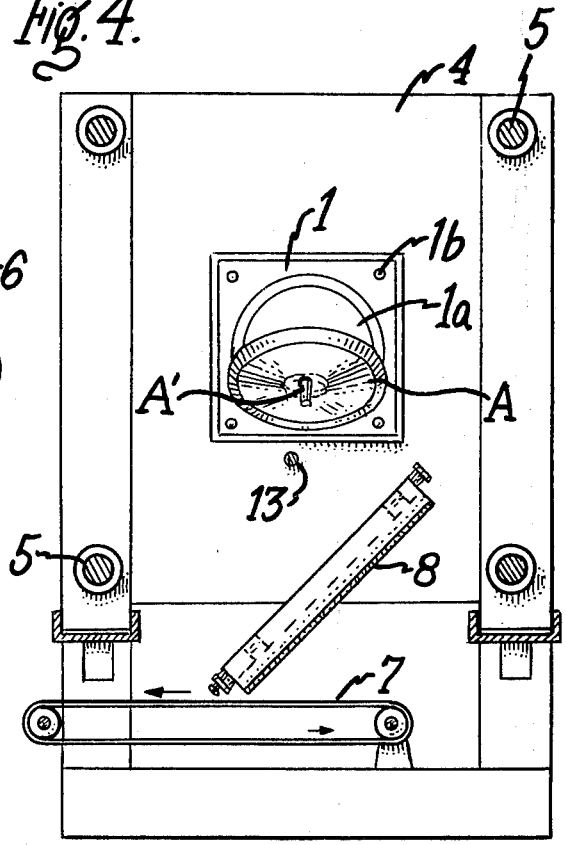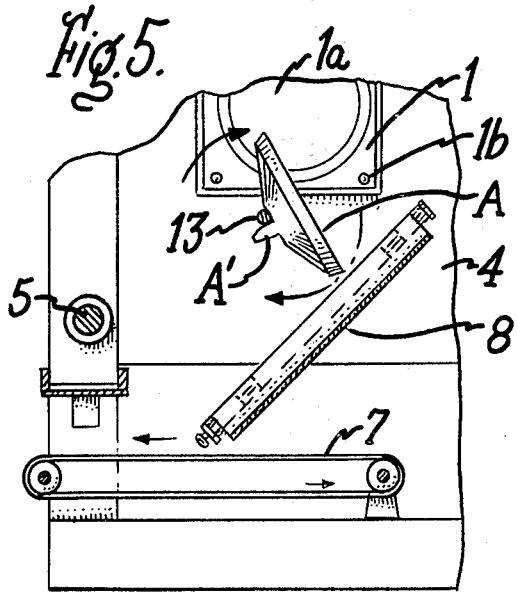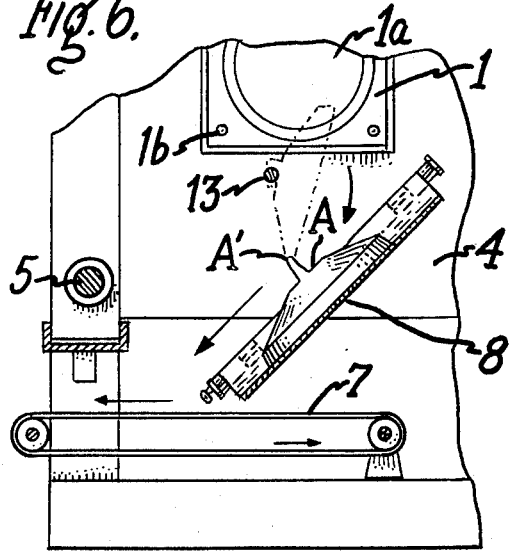

MOLDING APPARATUS WITH RECEIVING CHUTE DEVICE

The present invention relates to molding apparatus, and particularly to a chute device for such apparatus to receive and discharge the molded products.

It is an object of the invention to provide molding apparatus with an improved device for receiving and discharging the molded product with minimum risk of damage to the product.

Another object of the invention is to provide a receiving device of the above type which is simple, economical and readily installed, and which does not hinder the operation of the molding apparatus.

Still another object of the invention is to provide a receiving device of the above type having means to properly position the molded product when dropped from the molding apparatus.

Other objects and advantages will become apparent from the following description and the appended claims.

With the above objects in view, the present invention in one of its aspects relates to molding apparatus comprising, in combination, a pair of support members mounted for relative movement with respect to each other, a pair of complementary mold members mounted respectively on the pair of support members for movement between a closed contiguous position for molding an object therebetween and an open separated position allowing the molded object to drop therefrom, and a receiving device arranged between the support members below the mold members for receiving the molded object, the receiving device comprising a foldable sheet having opposite edges secured respectively to the pair of support members, whereby the folded sheet is in folded condition in the closed position of the mold members and is in unfolded condition for receiving the molded object dropped from the mold members when the latter are in open separated position.

The invention will be better understood from the following description taken in conjunction with the accompanying drawings, in which:

FIG. 1 is a perspective view, with parts broken away, of a molding apparatus equipped with a receiving chute in accordance with the invention;

FIG. 1a is an enlarged detailed view of a portion of the receiving chute shown in FIG. 1;

FIG. 2 is a side view of the molding apparatus with the mold members in closed position;

FIG. 3 is a view similar to that of FIG. 2 showing the mold members in open position with the molded product being ejected therefrom;

FIG. 4 is a view of the apparatus taken along the line 4—4 of FIG. 3; and

FIGS. 5 and 6 are views similar to FIG. 4 showing the manner in which the molded product drops in the desired position onto the receiving chute in accordance with an embodiment of the invention.

Referring now to the drawings, and particularly to FIG. 1, there is shown an injection molding machine for molding plastic products, and in the illustrated embodiment the apparatus is provided with complementary mold halves 1 and 2 for forming acrylic optical refractors of relatively large size for use in luminaires.

The injection molding machine, which is of conventional type, has a fixed platen 3 on which female mold member 2 is mounted and a movable platen 4 on which male mold member 1 is mounted. Movable platen 4 is slidable on tie rods 5 for movement toward and away from fixed platen 3, so as to place mold members 1, 2 in closed contiguous position as shown in FIG. 2 for the molding operation, and to move the mold members into open separated position as shown in FIG. 1 in which the molded product may be released so as to drop below the mold members. In the illustrated embodiment, mold member 1 has a punch portion 1a for forming a dish-shaped plastic refractor A (see FIG. 3), and mold member 2 has a complementary cavity 2a in which punch portion 1a is received in the molding position. Guide pins 1b on mold member 1 enter recesses in mold member 2 (see FIG. 2) to align the mold parts when in closed position. Tube 6 seated in fixed support 3 opens into mold cavity 2a for injecting plastic material to be molded, in a manner and by means well known in the art. Arranged at the bottom of the molding machine below the mold members 1, 2 is endless belt conveyor 7 for ultimately receiving and discharging the molded product from the molding apparatus.

In accordance with the invention, a receiving device in form of chut 8 is arranged sloping downwardly between mold members 1, 2 and conveyor 7 for catching the molded product as it drops and delivering it to conveyor 7 for discharge. Chute 8 preferably comprises a sheet 8a of flexible foldable fabric such as rubber, canvas, cloth or other textile material having its opposite margins wound on a pair of rollers 8b, 8c rotatably mounted on brackets 9, 9a which are respectively secured to support platens 3 and 4. Chute roller 8b is thus movable with platen 4 toward and away from fixed platen 3 so that in the closed position of mold members 1 and 2, as seen in FIG. 2, chute 8 is in folded inoperative condition, whereas in the open position of mold members 1, 2, chute 8 is spread into unfolded operative condition as seen in FIG. 1 for catching the molded object. With chute 8 in the latter position relatively close to the mold members, the molded object drops without damage onto the chute and slides therefrom onto moving conveyor 7 for delivery to the operator.

Handles 10, 10a at the lower end of rollers 8b, 8c allow the open width of chute fabric 8a to be adjusted to an appropriate dimension by winding or unwinding the fabric on the rollers to the desired degree. Once adjusted, rollers 8b, 8c are held against rotation on their mounting brackets 9, 9a by means of split clamps 12, 12a, as seen in FIG. 1a, and the rollers with sheet attached may be readily removed when the top clamp portions are taken off.

The foldable nature of chute device 8 allows the device to be installed between support platens 3, 4 in close proximity below mold members 1, 2 so that the molded object falls only a short distance before being caught and thus avoids the possible damage resulting from a long drop which would otherwise occur. Chute 8 then folds within a narrow space in the closed position of the molding machine, thereby avoiding any hindrance to the operation of the apparatus.

A further feature of the invention as depicted in FIGS. 3–6 is the provision of means in the described apparatus for controlling the position of the molded object as it drops onto chute 8 and thereby further reducing the risk of damage to the product. As seen in FIG. 3, molded refractor A has a sprue portion A' on one side formed in the injection molding process, the sprue being later removed in a suitable manner. When ejected from mold member 1, eg, by ejector pins (not shown) such as conventionally used in such apparatus, refractor A begins to fall downwardly between the mold parts. If the molded product is allowed to fall in the position shown in FIG. 3, it is liable to be damaged as a result of the sprue portion A' striking chute 8. In accordance with the invention, to avoid this problem there is arranged in the illustrated embodiment, as seen in FIG. 3, a flexible strand in the form of a cable or rope 13 secured to and stretched tightly between support platens 3, 4 just below mold members 1, 2 and laterally offset from the axis thereof (see FIG. 4) so as to be in the path of molded refractor A as it drops from mold member 1. As the refractor continues to drop, it comes into contact with cable 13 as seen in FIG. 5, resulting in the refractor being rotationally deflected and dropping onto chute 8 with the sprue side up. In this position, refractor A slides safely down chute 8 onto conveyor 7 for discharge thereby. Since cable 13 is flexible, it hangs down between platens 3 and 4 when the mold closes, while still being attached at its ends to the respective platens (see FIG. 2). As will be understood, cable 13 may be spring loaded, if desired, to maintain constant tension in its operative position, and it can be adjusted to any angle or position for proper contact with differently shaped products as appropriate.

While chute device 8 has been described as employing a fabric sheet, other forms of foldable material, such as a plurality of hinged metal sections or flexible screen material, could be used where appropriate. It will also be understood that the chute device may be arranged at angles and positions different from those shown, while still coming within the scope of the invention. Further, the chute device may be used in conjunction with other types of mold apparatus different from that shown.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Molding apparatus comprising, in combination, a pair of support members mounted for relative movement toward and away from to each other, a pair of complementary mold members mounted respectively on said pair of support members for movement therewith between a closed contiguous position for molding an object therebetween and an open separated position allowing the molded object to drop therefrom, and a receiving device arranged between said support members below said mold members for receiving the molded object, said receiving device comprising a foldable sheet having opposite edges secured respectively to said pair of support members, whereby said foldable sheet is in folded condition in said closed condition of said mold members and is in unfolded condition for receiving the molded object dropped from said mold members when the latter are in open separated position.

2. Apparatus as defined in claim 1, said receiving device comprising a pair of elongated members having said foldable sheet secured thereto at said opposite edges, and bracket means securing said elongated members respectively to said pair of support members.

3. Apparatus as defined in claim 2, said foldable sheet comprising a flexible fabric and being wound at its opposite edges on said pair of elongated members, and means for holding said elongated members against rotation relative to said bracket means.

4. Apparatus as defined in claim 1, said receiving device being in the form of a chute and arranged sloping downwardly below said mold members.

5. Apparatus as defined in claim 4, and conveyor means arranged below said receiving device for receiving the molded object therefrom.

6. Apparatus as defined in claim 1, and means for adjusting the dimension of said foldable sheet in unfolded condition between said opposite edges.

7. Apparatus as defined in claim 1, said receiving device being arranged in close proximity to said mold members with said foldable sheet sloping downwardly therefrom.

8. Apparatus as defined in claim 1, and flexible strand means extending between a pair of support members below said mold members in the path of fall of the molded object for deflecting the latter in predetermined manner.

9. Apparatus as defined in claim 4, and flexible strand means extending between said pair of support members below said mold members in the path of fall of the molded object for deflecting the latter in predetermined manner.

* * * * *

UNITED STATES PATENT OFFICE
CERTIFICATE OF CORRECTION

PATENT NO. : 3,986,811
DATED : October 19, 1976
INVENTOR(S) : William F. Gunnels It is certified that error appears in the above-identified patent and that said Letters Patent are hereby corrected as shown below:

Column 3, line 48 after the word "from" delete -- to --

Signed and Sealed this

Twenty-eighth Day of December 1976

[SEAL]

Attest:

RUTH C. MASON
*Attesting Officer*

C. MARSHALL DANN
*Commissioner of Patents and Trademarks*